Sept. 23, 1958 G. E. NICHOLSON 2,852,907
UNIVERSAL CHART CLOCK
Filed Oct. 9, 1953 6 Sheets-Sheet 1

INVENTOR
GEORGE E. NICHOLSON
BY Stauch, Nolan & Diggins
ATTORNEYS

Sept. 23, 1958   G. E. NICHOLSON   2,852,907
UNIVERSAL CHART CLOCK
Filed Oct. 9, 1953   6 Sheets-Sheet 2
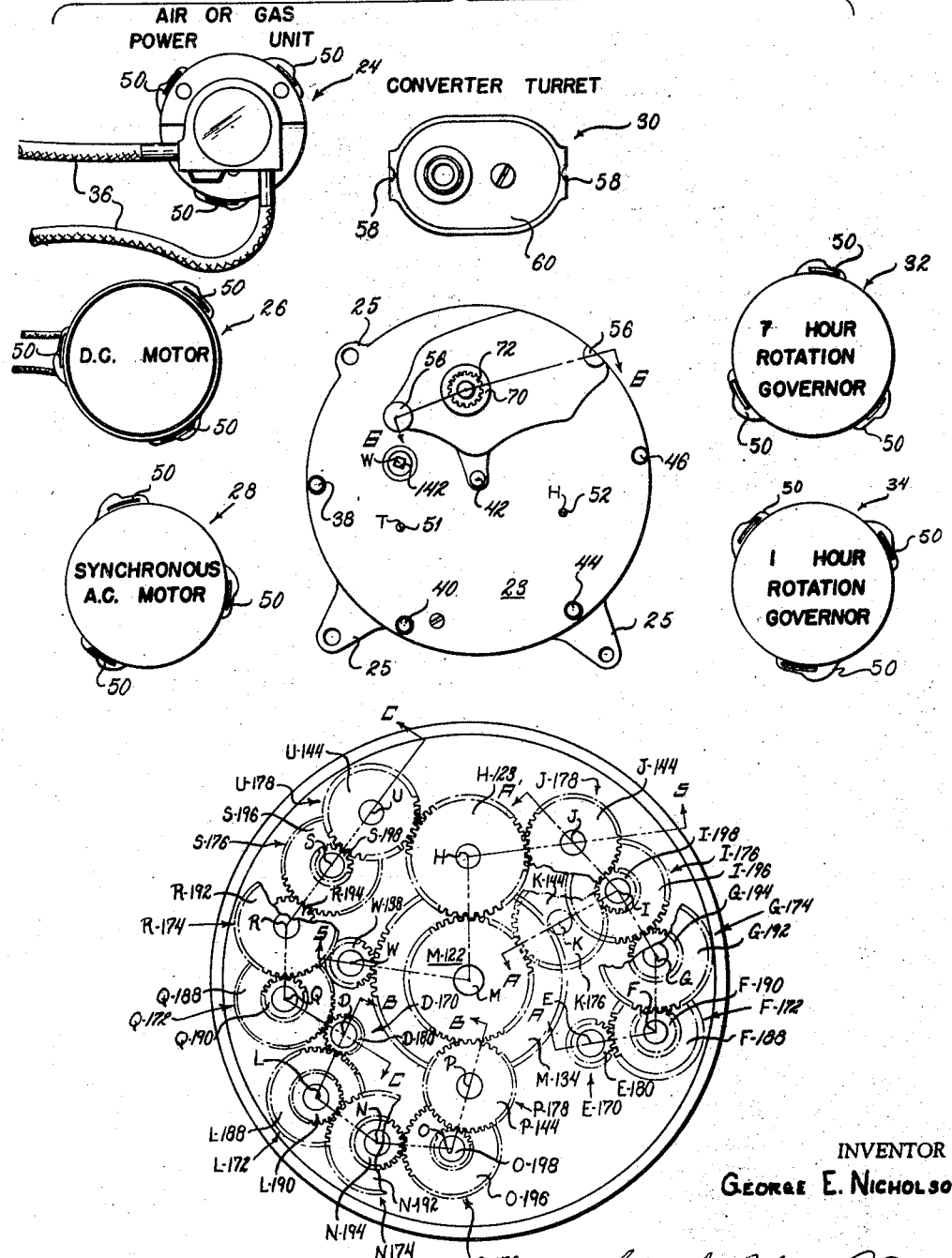
INVENTOR
GEORGE E. NICHOLSON
BY Stauch, Nolan & Riggins
ATTORNEYS

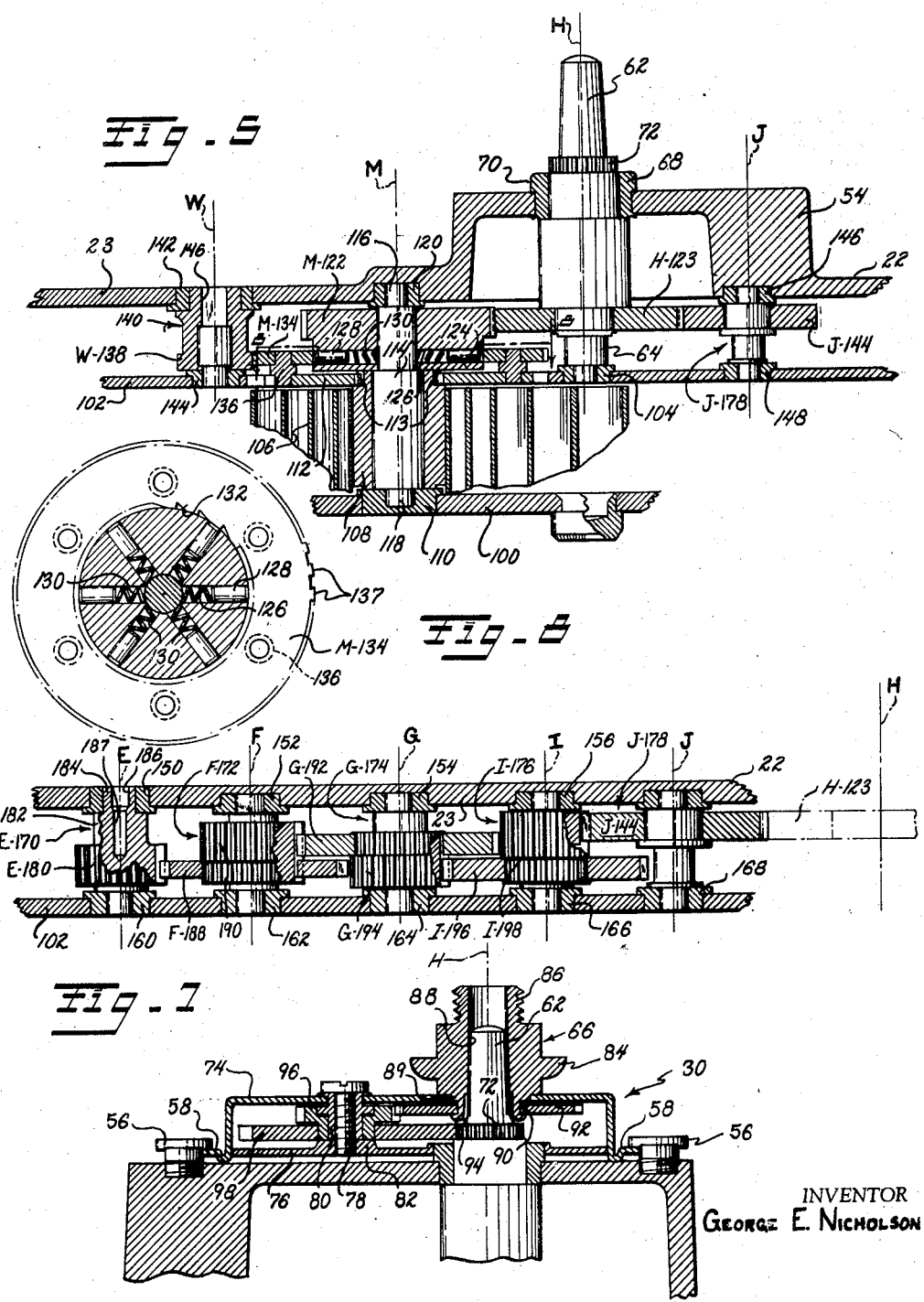

Sept. 23, 1958 G. E. NICHOLSON 2,852,907
UNIVERSAL CHART CLOCK
Filed Oct. 9, 1953 6 Sheets-Sheet 4
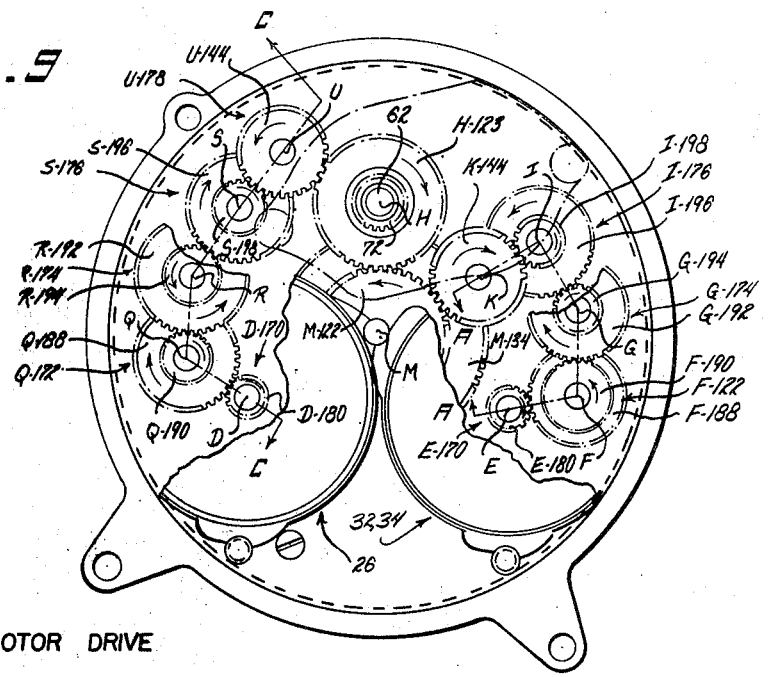
D.C. MOTOR DRIVE
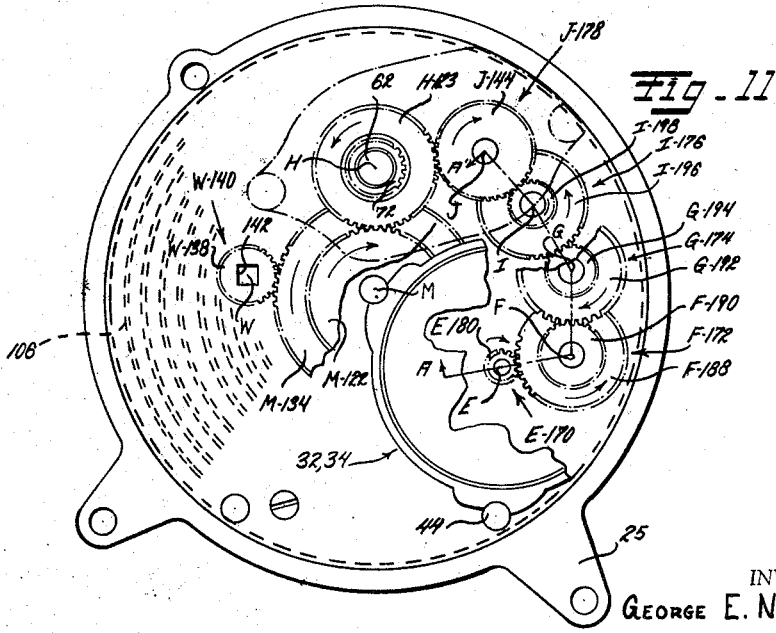
MAINSPRING DRIVE
INVENTOR
George E. Nicholson
BY *Strauch, Nolan & Riggins*
ATTORNEYS Sept. 23, 1958  G. E. NICHOLSON  2,852,907
UNIVERSAL CHART CLOCK
Filed Oct. 9, 1953  6 Sheets-Sheet 5

FLUID TURBINE DRIVE

SYNCHRONOUS
A. C. MOTOR DRIVE

INVENTOR
GEORGE E. NICHOLSON

BY Strauch, Nolan + Diggins
ATTORNEYS

Sept. 23, 1958 G. E. NICHOLSON 2,852,907
UNIVERSAL CHART CLOCK
Filed Oct. 9, 1953 6 Sheets-Sheet 6

MAINSPRING DRIVE

SYNCHRONOUS A. C. MOTOR

INVENTOR
GEORGE E. NICHOLSON
BY *Strauch, Nolan & Diggins*
ATTORNEYS

United States Patent Office 2,852,907
Patented Sept. 23, 1958

2,852,907

UNIVERSAL CHART CLOCK

George E. Nicholson, Tulsa, Okla., assignor to Precision Products, Inc., Tulsa, Okla., a corporation of Oklahoma Application October 9, 1953, Serial No. 385,216

12 Claims. (Cl. 58—7)

The present invention relates to drive mechanisms and more particularly to drive mechanisms which are used in recording chart clocks wherein a power output shaft is rotated at a slow constant rate.

The invention contemplates a novel universal chart clock drive mechanism comprising an assembly which permits the use of interchangeable power sources and will produce a wide range of drive shaft rotational speeds.

In many recording meters of the type employing rotary recording charts, the chart makes one complete revolution in a given period, for example, seven days. Such meters are provided with a drive mechanism having a shaft which makes one revolution every seven days and, if spring driven, the drive spring or mainspring is usually wound and the chart changed, once a week.

Other meters employ a clock driven shaft for the recording chart which makes a complete revolution every 24 hours. With such meters a 24 hour chart is employed and the clock is wound daily.

These are but two examples of the many chart drive rates commonly employed in general practice; depending on the specific application, it is frequently necessary that the chart make a complete revolution in as little as two hours or as long as 31 days. Furthermore, different types of primary power sources are employed, for example main springs, fluid driven turbines, D. C. motors, and synchronous A. C. motors.

Because of the wide range of varying requirements for different types of meters and installations, it has hitherto been necessary for manufacturers and suppliers to provide a large number of completely different chart drive mechanisms in order to fill the diverse needs of both standard and unusual installations.

Furthermore, it has been found in many cases that it is desirable to use a 24 hour chart, for example, where a seven day chart had previously been employed or conversely to use a meter having a seven day chart where a 24 hour chart had previously been used. Hitherto, in order to accomplish the desired result, a new clock had to be installed in the meter or two different meters used. In many cases the conversion from one rate of chart drive to another is temporary or seasonal rather than permanent, e. g., when it is desirable to use 24 hour charts during certain periods of time or seasons of the year and seven day charts during the remainder or when it is necessary to obtain magnified chart readings by rotating the chart once an hour or once every four hours instead of once a day.

Heretofore, all these conditions have been met by changing the clock or chart drive mechanism or installing complete new meter assemblies embodying the desired chart clock, which procedure is expensive and time consuming and required the manufacturers and distributors of such equipment, respectively, to produce and to maintain large inventories of completely different meters and chart clocks in order to fill all needs.

The present invention contemplates a drive mechanism particularly adapted for use as a chart drive comprising a single transmission unit which may be easily selectively assembled or reassembled to provide a wide range of shaft rotational speeds varying, in the exemplary embodiment hereinafter disclosed, from one revolution in 2 hours to one revolution in 31 days and which will accommodate either a mainspring, fluid driven turbine, D. C. motor or synchronous A. C. motor as the primary power source, the latter three of such power sources being provided in the form of compact sub-assemblies which may be quickly and easily interchanged and the transmission assembled accordingly to suit the power source.

Accordingly, it is a basic object of the present invention to provide a novel universal drive mechanism particularly, but not exclusively, adapted for driving recording charts.

Another important object of the invntion is the provision of an improved drive mechanism adaptable to drive a shaft at a wide variety of constant rotational speeds from various primary power sources.

Still another important object of the invention is to provide a novel transmission having a plurality of interchangeable gear trains which may be aassembled to achieve either clockwise or counterclockwise rotation of an output shaft regardless of the direction of rotation of the power source.

Another object of the invention is to provide an improved drive mechanism comprising a transmission having a plurality of interchangeable gear trains which may be driven by a mainspring, fluid driven turbine, D. C. motor or synchronous A. C. motor.

Another object of the invention is to provide a novel transmission housing embodying means for selectively mounting one of a variety of different power sources and which is adapted to mount different interchangeable rotation governors to control the action of the power source, if the nature of the power source so requires, to obtain a constant output speed of any desired value.

Still another object of the invention is to provide a novel transmission housing as in the next preceding object which is adapted to selectively mount one or two gear trains in various positions according to the requirements of the power source and rotation governor and to mount interchangeable converter turrets for varying the rate of rotation of the final output shaft independent of the power source and rotation governor, if any, which is installed.

A further object is to provide an improved chart drive clock, including mechanism which may be selectively assembled from a minimum number of different parts to accommodate a variety of different power sources, rotation governors and converter turrets to obtain a wide range of constant rotational speeds of the chart carrying hub.

A still further object of the invention is to provide an improved universal chart drive clock with which chart rotation speeds ranging, in the disclosed form, from 1 revolution in two hours to 1 revolution in 31 days may be obtained from a variety of power sources without disassembly of clock, by substitution of compact subassembly units mounted on the housing of the clock.

Another object of the invention is to provide a drive mechanism, particularly adapted for driving recording charts, which overcomes the problems and disadvantages of comparable prior art devices and particularly those disadvantages outlined above.

These and additional objects and advantages of the present invention will be apparent to those skilled in the art from a reading of the following description of a preferred embodiment thereof in conjunction with the subjoined claims and appended drawings in which:

Figure 3 is a top plan view of the drive mechanism as shown in Figure 1 surrounded by alternate interchangeable subassemblies;

Figure 4 is a diagrammatic top plan view of the transmission oriented in the same position as shown in Figure 3 but on a larger scale and with all subassemblies removed and the upper surface of the housing omitted to show details of the underlying gearing;

Figure 5 is a fragmental sectional view of the transmission taken on line 5—5 of Figure 4;

Figure 6 is a fragmental sectional view of the transmission taken on line 6—6 of Figure 3 showing the chart drive shaft and a converter turret installed thereon;

Figure 7 is a fragmental sectional view of a transmission gear train indicated by section line A'—A of Figure 4; this view is substantially the same for section lines and gear trains A—A, B—B and C—C of Figure 4;

Figure 8 is a sectional view on line 8—8 of Figure 5 showing details of the winding ratchet assembly;

Figure 15:
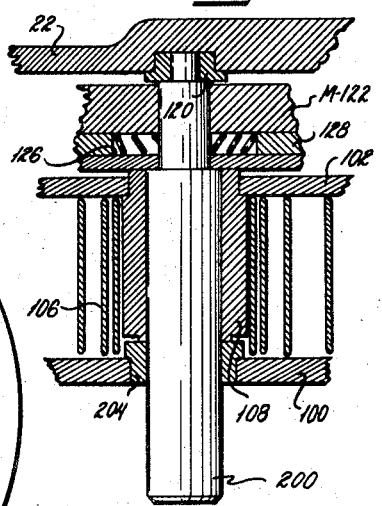

Figures 9-14, inclusive, are views similar to Figure 4 showing some of the alternative arrangements of the transmission gearing for various types of drive and directions of rotation of the chart hub;

Figure 15 is a fragmental sectional view similar to the central portion of Figure 5 but showing a modified form of construction.

Figure 1:
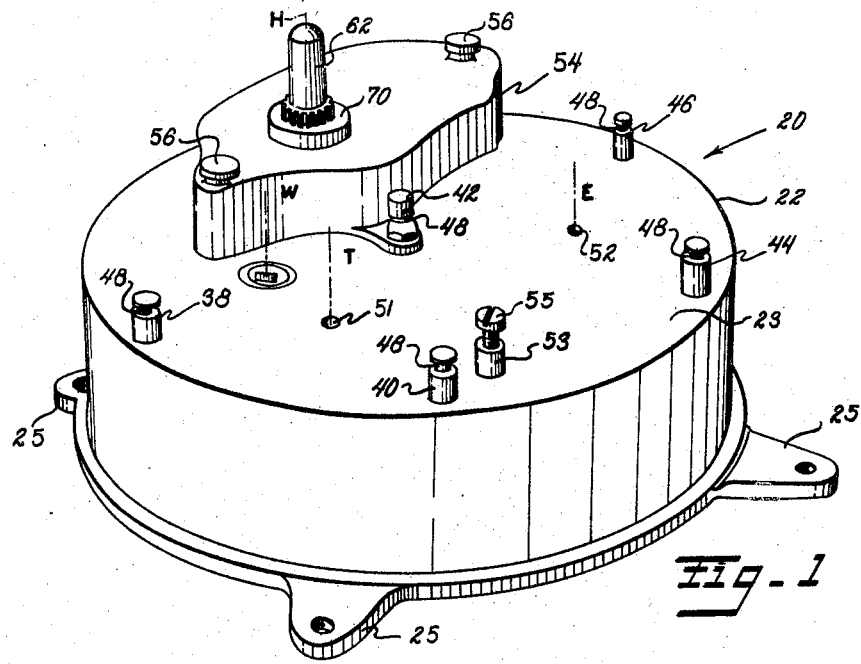
Figure 1 is a perspective elevational view of the main structural unit of a drive mechanism according to the principles of the invention with all subassembly units removed for clarity of illustration.
Figure 2:
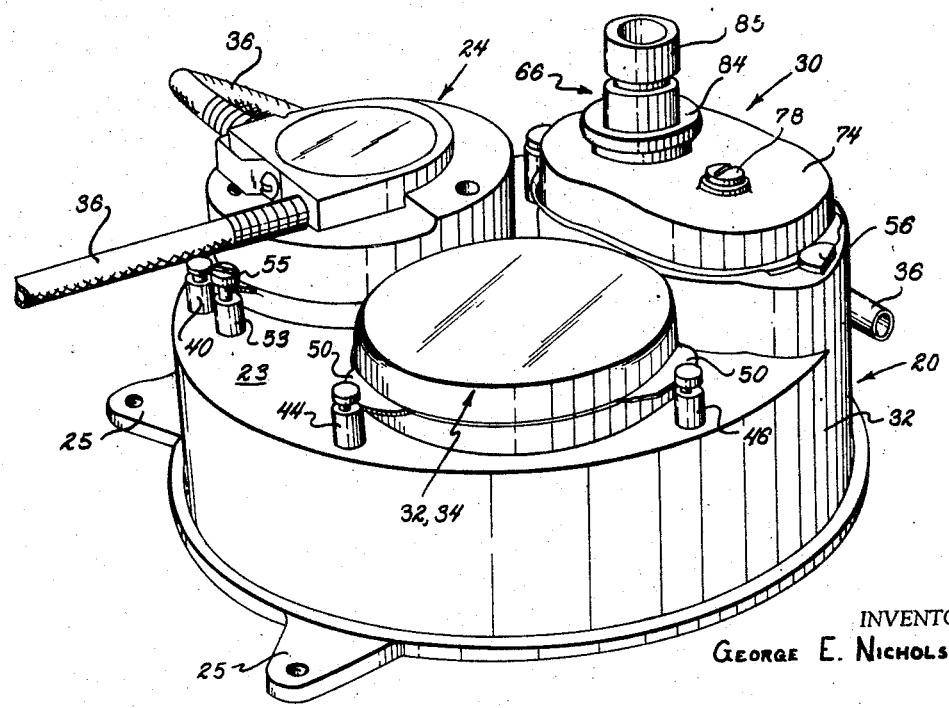
Figure 2 is a perspective elevational view similar to Figure 1 but showing the drive mechanism as viewed from another angle and with certain selected subassemblies installed thereon.

With continued reference to the drawings wherein the invention is shown as embodied in a chart clock, and first referring particularly to Figures 1 and 2, numeral 20 designates generally a transmission which forms the basic unit of the chart clock. The working parts of the transmission are enclosed in a substantially cylindrical housing 22 having a flat upper surface 23 and a plurality of radial mounting ears 25 adjacent to the base by means of which the housing may be fastened to a support, not shown.

Surface 23 is adapted, in a manner hereinafter described, to selectively mount one or more of the subassemblies shown in Figure 3. The subassemblies consist of (1) four interchangeable power sources or torque generators, i. e., a fluid driven turbine 24, a D. C. motor 26, a synchronous A. C. motor 28 and a mainspring (not shown in Figure 3); (2) a converter turret 30; and (3) a seven hour rotation governor or escapement 32 and a one hour rotation governor 34.

Individually each of the power sources and rotation governors and the converter turret are well known in the art and, other than in combination, no claim is made to the novelty of these components per se.

The turbine 24 consists generally of a circular housing enclosing operative parts (not shown) which consist, primarily, of a turbine wheel or rotor having a plurality of radially extending circumferentially spaced blades or buckets, and a nozzle positioned to direct a stream of fluid under pressure tangentially against the blades of the rotor. Tubular conduits 36 are supply and exhaust lines for working fluid to drive the turbine, the supply line being connected to a source of driving fluid under suitable pressure. A power take-off shaft, not shown, driven by the rotor extends centrally through the underside of the housing and is drivingly associated with the transmission 20 in a manner hereinafter described.

The D. C. motor 26 and the A. C. motor 28 are substantially identical in outward appearance and are, like the turbine, enclosed in substantially round housings. As is well known, the speed of the D. C. motor is variable, while a synchronous A. C. motor will run at a constant speed determined by the manner of poles and frequency of the current supplied which frequency is accurately controlled at the generating source in most localities. Therefore, insofar as drive speed is concerned the D. C. motor and the turbine are analogous or related in the sense that they must be extrinsically governed to obtain a constant rotational speed whereas the synchronous A. C. motor inherently rotates at constant speed provided, of course, that the frequency of the current supplied is maintained constant. The importance of these distinctions will become apparent as the description proceeds.

The mainspring drive means is housed within the transmission housing (see Figure 5) and its construction and operation will be described with the transmission.

Like the A. C. and D. C. motors shown, the seven hour and one hour escapement 32 and 34, respectively, are similar in outward appearance encased in substantially identical circular housings. The function of an escapement, i. e., to accurately and invariably regulate and control the rate of rotation of a shaft is well known and therefore the details of construction of the particular escapement employed in conjunction with the invention, fully disclosed in United States Letters Patent No. 2,562,635, are not made part of this disclosure. However, both escapements include arbors, not shown, the rate of rotation of which is controlled by the escapement mechanism, projecting centrally through the under side of the housing and provided with means, hereinafter described, for drivingly associating the arbor with the shaft to be controlled thereby. The respective escapements are called "seven hour" and "one hour" escapements or rotation governors because they permit the shaft coupled to the arbor to complete one revolution in the nominal period; it will be appreciated that escapements having different arbor speeds than in the disclosed form of the invention may be used.

The converter turret or adapter 30 is of a standard type and, as will appear in the following description, functions to step up or reduce the effective speed or rotation of the drive or power output shaft of the transmission.

The manner in which the various subassembly components are mounted on the transmission housing 22 will now be described and the operative association between the components and the transmission mechanism will become apparent as the description proceeds.

Referring now to Figures 2 and 3, the flat upper surface 23 of transmission housing 22 is provided with a plurality of upstanding lugs 38, 40, 42, 44 and 46 each of which has a circumferential groove 48 adjacent the upper end thereof. The housings of each of the power sources and rotation governors are equipped with equiangularly spaced peripheral bayonet type mounting ears 50. The loci of lugs 38, 40 and 42 and lugs 42, 44 and 46 are two equilateral triangles having a common apex at 42. At the center of these triangles, surface 23 of the transmission housing has apertures 51 and 52, respectively. Thus, any one of the drive means 24, 26 or 28 may be mounted on the transmission housing by turning the casing thereof so that bayonet ears 50 engage in the grooves 48 on lugs 38, 40 and 42 and the power take-off shaft of said drive means, extending centrally from the underside of the casings, will automatically be aligned with and extend into aperture 51. Similarly, either of the escapements 32 or 34 may be mounted between lugs 42, 44 and 46 with the escapement arbor extending into aperture 52.

A boss 53 adjacent lug 40 accommodates the threaded insertion of a motor locking screw 55 which, when inserted, prevents dislocation of the drive unit installed on lugs 38, 40, 42 under the effect of torque reaction.

Adjacent one edge of and preferably integral with housing 22, upper surface 23 is formed with a flat-surfaced raised portion or a boss 54 provided at spaced points with undercut lugs 56 adapted to receive relieved ears 58 on opposite ends of the converter 30 whereby the converter may be operatively positioned on the boss, when required.

The converter 30 is of a standard type and, as will appear in the following description, may be employed to reduce or step up the effective speed of rotation of the shaft to which it is attached. Only one converter is disclosed but it will be understood that the speed ratio change effected by a particular converter is governed by its internal gearing and that the present invention contemplates the use of a number of converters each having different gear ratios.

The structure of converter 30 insofar as it relates to the present invention will now be described, but before proceeding it is pointed out that in the interest of clarity the following system of designation is adhered to throughout the description:

(1) Section lines A—A, A'—A, B—B and C—C (see Figure 4) are used to designate entire gear trains of the transmission, the section lines passing through the axes of all the gears included therein;

(2) Capital letters of the alphabet beginning with the letter "D" are used to designate the axis of rotation of gears or gear clusters of the transmission;

(3) Individual gear elements are designated by arabic numerals prefixed with the axis of rotation, identical gear elements having the same arabic number.

Referring now to Figures 5 and 6, the upper end 62 of a power output or hub drive shaft 64 of transmission 20 extends through the upper surface of boss 54 and is suitably tapered to be received in a complementary socket in a standard chart support hub (not shown) to support and drive the hub.

Adjacent its tapered section 62, shaft 64 is rotatively journalled in a bushing 68, crimped into the upper surface of boss 54, and carrying at its upper end a radial flange 70 which forms a raised annular shoulder around the base of section 62. Immediately above flange 70, a spur gear 72 is preferably formed integrally with the base of shaft section 62, and therefore has axis of rotation "H," the axis of shaft 64.

Turret 30 consists of a relatively shallow oblong casing 74 (Figure 6) on the ends of which are formed the attachment ears 58 for securing the turret to the upper surface of boss 54. The underside of casing 74 is closed by a substantially flat plate 76 secured to the casing by a screw 78 passing through the upper surface of the casing, through a tubular sleeve 80 and threaded into a thickened portion 82 of the plate.

A special chart hub 66, having a radial chart support flange 84 on which a replaceable recording chart (not shown) is clamped by a nut 85 (see Figure 2) engaged on threaded portion 86 of the hub, is formed with an oversized tapered axial bore 88 so as to rotatively receive section 62 of the drive shaft. Hub 66 is rotatively secured to the upper surface of casing 74 by a reduced diameter portion 89 journalled in a suitable aperture in the casing and a further reduced portion 90 mounts a gear 92, non-rotatably clamped against portion 89 of the hub by a turned over flange 94. Thus the hub and gear are non-rotatable relative to each other but are jointly rotatable relative to the casing.

Gear 92 meshes with a pinion 96 rotatably mounted on tubular sleeve 80 and is fixed to or formed integral with a coaxial gear 98 meshing with gear 72 on drive shaft 64. From the structure described it will be understood that hub 66 is driven by shaft 64 through gear train 72—98—96—92 and that any reasonable speed ratio between shaft 64 and the hub can be achieved by proper selection of the gears in the train.

Further details of the converter may be had by reference to United States Patent No. 2,211,755 to John B. McGay.

Of the power sources useable with the invention, only the main spring drive, which will now be described with reference to Figure 5, is incorporated within the transmission housing 22 and therefore can not be interchanged with other drives from the exterior of the housing.

Referring then to Figure 5, housing 22 has a back closure plate 100 rigidly secured thereto by suitable fastening means not shown. Also rigidly secured within housing 22 and spaced between and parallel to the upper surface 23 of the housing and closure plate 100 is a support plate 102 carrying a bushing 104 journalling the lower end of drive shaft 64.

A coil-type mainspring 106 has its outer coil end secured to the housing and its inner end secured to a torque sleeve 108 having its lower end supported by a bushing 110 in plate 100 and carrying an annular flange 112 non-rotatably secured to its upper end as by a spline connection 113. A main arbor 114 has a large diameter portion rotatably received in sleeve 108 and upper and lower pivots 116 and 118, respectively, the lower pivot being journalled in bushing 110 and the upper in a bushing 120 in the underside of surface 23 of the housing.

Secured to or integral with the upper portion of main arbor 114 is a gear 122 (axis M) in mesh with a gear H-123 on drive shaft 64 and having a concentric portion 124 of smaller diameter on the underside thereof containing a number of radial bores 126 (Figure 8) each containing a pawl member 128 biased radially outwardly by a spring 130.

The outer ends of pawls 128 are in operative engagement with a set of ratchet teeth 132 formed on the inner circumference of a gear ring M-134 rigidly fixed in spaced parallel relation above flange 112 by a plurality of spacing lugs 136 and having gear teeth 137 on its outer periphery meshing with a pinion W-138 (axis W) on a wind square 140 journalled between bushings 142 and 144 in housing 22 and plate 102, respectively. The wind square shown is of the female type having a non-circular internal aperture 146 to accommodate insertion of a winding key but a male wind square or a dummy may be substituted, the latter where a power source other than a mainspring is used.

The direction of the ratchet relative to the mainspring coil are selected so that torque applied to the wind square is transmitted through pinion W-138 to gear ring M-134 and then through spacers 136, flange 112 and sleeve 108 to wind the mainspring during which operation the pawls 128 override the ratchet teeth, gear M-122 and associated elements remaining stationary. When the wound mainspring unwinds, torque is exerted on sleeve 108 turning gear ring M-134 in the reverse direction causing the ratchet teeth to drivingly engage pawls 128 and thus rotate gears M-122, H-123 and shaft 64.

An idler gear J-144 journalled between bushings 146 and 148 in housing 22 and plate 102 for rotation about an axis (J) parallel to the drive shaft is in mesh with gear H-123 and serves a purpose which will hereinafter appear.

A typical gear train A'—A employed in transmission 20 is illustrated in Figure 7, showing the manner in which all gear trains used in the invention are mounted.

Referring then to Figure 7 and, for the purposes of orientation to Figure 4, a plurality of bushings 150, 152, 154, 156 and 158 are mounted in housing 22, in coaxial alignment with bearings 160, 162, 164, 166 and 168 respectively mounted on support plate 102, and defining a plurality of spaced parallel axes E, F, G, I and J about which rotate respective coupling gear elements E-170, F-172, G-174, I-176 and J-178. Gear element E-170 comprises a pinion E-180 having a cylindrical upward extension 182 reduced as at 184 where it projects through upper bearing 150, terminating flush with the upper surface 23 of housing 22. Extension 182 contains a coaxial drive socket 186, having a non-circular portion 187, complementary to and adapted to non-rotatably receive the arbor of an escapement 32 or 34 mounted on the housing in the manner hereinbefore described.

Gear elements F-172, G-174, I-176 are gear clusters each consisting of a coaxial gear and pinion. Thus F-172 comprises a gear F–188 meshing with pinion E–180 and a pinion F–190 meshing with a gear G–192 of element G–174 which carries a pinion G–194 meshing with gear I–196 of element I–176 which carries a pinion I–198 meshing with gear J–144 of gear element J–178.

From the structure thus fare described, it will be understood that gear elements E–170 and H–123 are kinematically related through the gear train A—A', i. e., through E–180, F–188, F–190, G–192, G–194, I–196, I–198 and J–144 and therefore when an escapement 32 or 34 is mounted on the housing 22 with its arbor inserted in socket 186, the escapement mechanism will control the rate of rotation of gear H–123 and, therefore, hub drive shaft 64.

Referring to Figure 4, all the gear trains useable in the transmission are shown in the respective positions which they may occupy and are indicated by section lines A—A, A'—A, B—B and C—C. It is to be understood, however, all trains are shown together in this one view merely as an expedient to facilitate illustration, description and to establish the relative positions and orientation of the trains. In practice, only one or two trains are used at a time.

Gear train A—A are identical to A'—A except that idler gear J–144 meshing with gear H–123 is replaced by idler gear K–144 having its axis at K and meshing with gear M–122. In keeping with their function as will hereinafter appear, trains A—A and A'—A, described above will be referred to as "control trains" while B—B and C—C, now to be described, are designated as "drive trains." In practice, the transmission comprises 1 gear train (drive or control) or a pair consisting of 1 drive train and 1 control train.

Gear train B—B comprises a gear element D–170 rotatable about axis D, which is identical to E–170 (Figure 7) being adapted by means of a socket (not shown, but corresponding to socket 186 of E–170) to drivingly receive the arbor or drive shaft extending from the selected power source, i. e., turbine 24, D. C. motor 26, or synchronous A. C. motor 28, mounted on housing 22 between lugs 38, 40, 42 (Figure 3).

It appears in Figure 4 that pinion D–180 of gear element D–170 is in mesh with the adjacent gears of two separate trains viz., B—B and C—C; actually this would be the case if both trains were installed in the housing but, as mentioned above, B—B and C—C are both drive trains and therefore are never used jointly.

Assuming, then, that train C—C is not in the transmission as illustrated in Figure 4, pinion D–180 meshes with gear L–188 of a gear cluster L–172 of train B—B. In addition to gear cluster L–172, the train includes clusters N–174 and O–176, the three clusters having respective, parallel axes of rotation L, N, O and each are identical to clusters F–172, G–174 and I–176, respectively, of gear trains A—A and A'—A. Pursuant to the system of reference set out above the specific gears and pinions of each cluster are designated in the drawings with the same arabic reference numerals as the corresponding parts in train A—A and A'—A but prefixed with the capital letter indicating the axis of rotation of the cluster.

Pinion O–198 of cluster O–176 meshes with idler gear P–144, and therefore torque supplied to pinion D–180 is transmitted through train B—B, in the same manner as specifically described for train A'—A, to gear P–144 which meshes with gear M–122 if such is present in the transmission which, as will be seen, is not always the case.

Gear train C—C comprises pinion D–180 and three clusters Q–172, R–174 and S–176 having their respective and parallel axes of rotation at Q, R and S. These clusters and their respective gears and pinions are identical to the respective clusters, gears and pinions of trains A—A, A'—A and B—B which are designated with corresponding arabic numerals. Consequently, the manner of operation of train C—C is likewise the same as the other trains, torque applied by pinion D–180 being transmitted to a gear element U–178 rotatable about axis U and comprising a gear U–144 meshing with gear H–123.

D. C. MOTOR DRIVE

Exemplary operative combinations of gear trains are shown in Figures 9–14 and referring first to Figure 9, the universal chart drive is shown as assembled to utilize D. C. motor 26 as a power source. In this instance, the transmission includes a drive gear train C—C, a control gear train A—A, hub gear H–123, and main arbor gears M–122 and M–134, gear U–144 of train C—C being in mesh with hub gear H–123, which in turn meshes with main arbor gear M–122 which in turn meshes with idler gear K–144 of train A—A. Gear M–134 is present because it is a normal part of the main arbor assembly (see Figure 5) but is inoperative in this and all transmission variations which do not utilize a mainspring as a power source.

Still referring to Figure 9, D. C. motor 26 is mounted on housing 22 with its drive shaft (not shown) drivingly engaging gear element D–170 to rotate pinion D–180 thereof in, for example, a counterclockwise direction as indicated by the arrow thereon.

In like manner, an escapement, 32 or 34 is mounted on housing 22 with its arbor drivingly associated with gear element E–170.

Operation

Motor 26 exerts torque on pinion D–180 tending to rotate it in the direction of the arrow thereon and this torque is transmitted through drive gear train C—C in the obvious manner, each element thereof tending to rotate in the direction indicated by the respective arrows. Clockwise torque is thus impressed on hub drive gear H–123 which tends to rotate the associated hub shaft 62, 64 in the same direction. The rate at which gear H–123 may rotate, however, is controlled by the escapement which is kinematically related thereto through gear M–122 and control gear train A—A. The angular velocity of the hub may be changed by substituting escapements, e. g., 32 (7 hours) for 34 (1 hour).

The nominal speed of escapement is the speed of the escapement arbor, e. g., in the one hour escapement, the arbor makes one revolution per hour. This is not the speed resulting at the hub shaft unless of course, the ratio through control train A—A is 1 to 1. In the present exemplary form the train A—A has ratio of 18 to 1, that is a rotational speed of 1 revolution per hour permitted by the one hour escapement 34 in pinion E–170 results in a speed of ⅛₈ revolution per hour in idler K–144. The ratio between K–144 and M–122 is 4 to 3 and between M–122 and H–123 is 1 to 1. The total ratio from pinion E–180 to gear H–123, then is $$\frac{18}{1} \times \frac{4}{3} \times \frac{1}{1}$$

or 24 to 1. Thus, with a one hour escapement, shaft 62 makes one revolution in 24 hours and, with a seven hour escapement, one revolution in 168 hours, viz., 7 days. The precise gear ratios of specific gears and clusters are given hereinafter by way of example but any necessary and convenient ratios may be employed within the scope of the invention.

Still referring to Figure 9, the power source is D. C. motor 26, the normal direction of rotation of which has been arbitrarily given as counterclockwise. This results in a clockwise rotation of the chart hub drive shaft 62, i. e., the direction of rotation at the output is opposite to the input.

Figure 10:
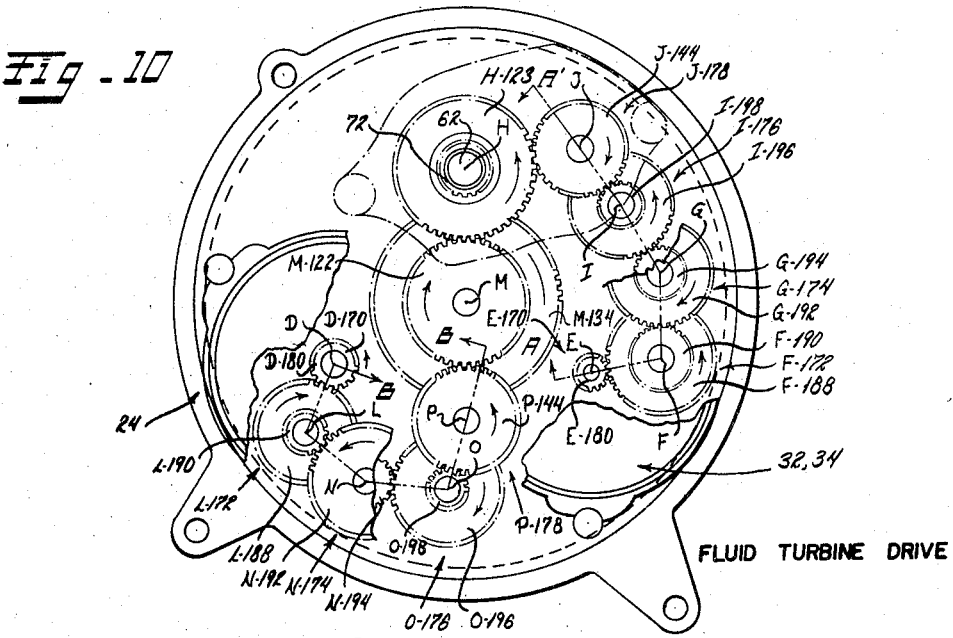

The transmission may be varied, however, so that input and output rotation will be in the same direction, such a variation being shown in Figure 10 wherein the primary drive means, is a turbine 24 adapted to rotate in a counterclockwise direction. As pointed out hereinabove, the D. C. motor and turbine are analogous power sources in that the speed of rotation must be extrinsically controlled and therefore, it will be understood turbine 24 can be substituted for the motor 26 in Figure 9 and vice versa in Figure 10.

FLUID TURBINE DRIVE

Referring then to Figure 10, the transmission assembled within housing 22 comprises control train A'—A and drive train B—B, main arbor gears M-122 and M-134, and hub drive shaft H-123 while the external components are turbine 24 and an escapement 32 or 34, mounted in the manner disclosed.

Operation

Briefly, then, turbine 24 exerts counterclockwise torque on pinion D-180 which torque is transmitted through drive train B—B and main arbor gear M-122 and, as shown by the arrows on the various gear elements, emerges as counterclockwise torque in hub drive shaft gear H-123. The angular velocity of gear H-123 and, consequently, shaft 62 is regulated by the escapement which is kinematically coupled to gear H-123 through control train A'—A. The train ratio of both control trains (A—A and A'—A) being the same for purposes of this exemplary disclosure the rate of rotation of hub shaft 62 is 1 revolution in 24 hours or in 7 days depending on whether the one hour or seven hour escapement is installed.

In the variations already described the nature of the power source (turbine and D. C. motor) require both control trains and drive trains, the former because the power source must be extrinsically governed to obtain a desired speed and the latter because the power sources inherently operate at relatively high speeds which must be geared down to obtain a desirable speed-torque relationship.

Where the torque produced by the power source is independent of rotation, as in the case of the mainspring drive, no speed reduction and, consequently, no drive train is required. Conversely, where a constant rotational speed is an inherent characteristic of the power source, as in the case of a synchronous A. C. motor, it is only necessary to reduce (or increase) the speed to a desired value and, therefore, no extrinsic speed governing agency is required thus eliminating the need for the escapements and control trains.

MAINSPRING DRIVE

An example of a mainspring drive adaptation of the transmission is shown in Figure 11 wherein mainspring 106 is installed in housing 22 and operatively connected to the transmission as shown in Figure 5. In this instance the transmission comprises main arbor gears M-122 and M-134, hub drive shaft gear H-123 and gear train A'—A while an escapement 32 or 34 is mounted on housing 22 in the manner described. It will be noted that from the escapement through control train A'—A, gears H-123 and M-122, the transmission is identical to the variation shown in Figure 10.

With the mainspring drive, however, and only then, gear H-134 comes into use, forming part of the winding assembly which includes winding square 142, winding pinion W-138, and unidirectional ratchet drive 128, 132, 136, 112 and 108 (Figure 5). In variations where drive means other than a mainspring are employed, a dummy or plug may be substituted for the winding pinion and square.

In the mainspring installation shown, Figures 5 and 11, the mainspring and its winding ratchet were arbitrarily installed to produce a clockwise torque and, therefore, winding of the spring is accomplished by inserting a suitable key or the like (not shown) into square 142 and turning it in a clockwise direction. This rotates main arbor gear ring M-134 and associated spacers 136, plate 112 and sleeve 108 in a counterclockwise direction tightening the spring coils around the sleeve. During this winding, ratchet teeth on the inner circumference of ring M-134 override pawls 128 but as the wound spring uncoils in the opposite (clockwise) direction, the ratchet teeth and pawls drivingly engage to transmit torque to gear M-122 and from there to H-123 which rotates slowly in a counterclockwise direction under the regulation of escapement 32 or 34 transmitted through control train A'—A.

In order to obtain reverse (clockwise) rotation of shaft 62, the same mainspring assembly may be used. The mainspring, however, is assembled in an inverted position from that shown in Figures 5 and 11 thus reversing the direction of the coil. In such a position, the spring is wound in a clockwise direction and produces a counterclockwise torque. The reversed winding direction is achieved by inverting gear ring M-134 on spacers 136 to reverse the direction of the ratchet teeth. The changeover is completed by substituting control gear train A—A for A'—A which involves only the omission of idler gear J-144 (Figure 11) and substitution of idler K-144 therefor. The change in control trains is necessary to maintain a constant direction of rotation in the escapement because mechanical escapements are unidirectional in operation (clockwise for those shown in this disclosure).

Figure 12:
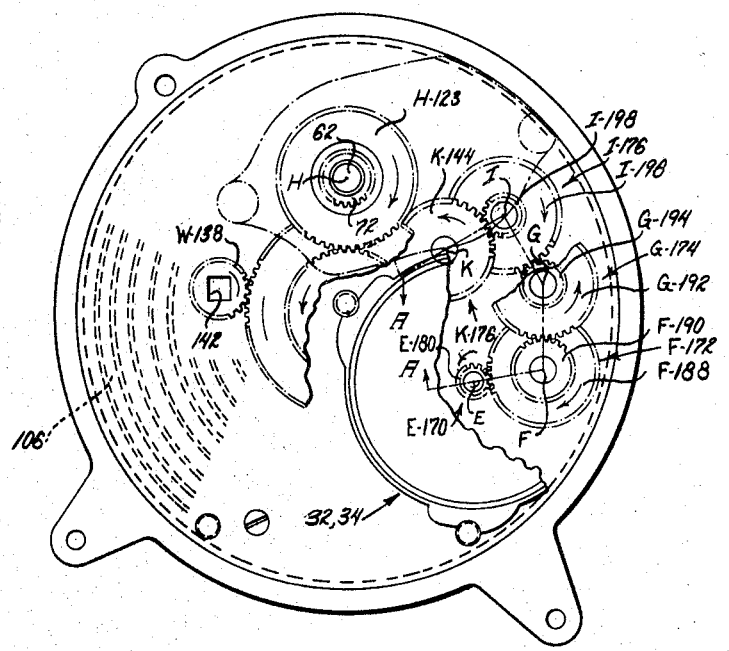

Thus modified for clockwise rotation of shaft 62, the transmission would appear as shown in Figure 12, wherein the control train acts on gear M-122 through idler K-144 (train A—A) instead of on gear H-123 through idler J-144 (train A—A') Figure 11.

SYNCHRONOUS A. C. MOTOR DRIVE

Where a synchronous A. C. motor is employed as the basic drive, no control train is necessary, as has been explained. Using a synchronous motor the normal direction of rotation of which is, for example, counterclockwise (Figure 13), in order to obtain clockwise rotation of shaft 62, the transmission comprises only drive train C—C and hub drive shaft gear H-123. The counterclockwise rotation imparted to pinion D-180 is transmitted through the train in obvious manner and causes clockwise rotation of shaft 62, the speed of which depends on the speed of the motor and the ratio of the train.

The ratio of train C—C is 18 to 1 and the total ratio between pinion D-180 and gear H-123 is 24 to 1, as already explained for train A—A. Neglecting slip, the speed of the synchronous motor is $$\frac{120f}{P}$$

where $f$ is the frequency and $P$ the number of poles. Therefore, shaft 62 rotates at a speed of $$\frac{24 \times 120f}{P}$$

revolutions per minute. Commercial current is usually supplied at 25 or 60 cycles but a wide variety of shaft speeds may be obtained by changing motors, gear ratios and/or altering the current frequency as by means of a frequency converter.

Figure 13:
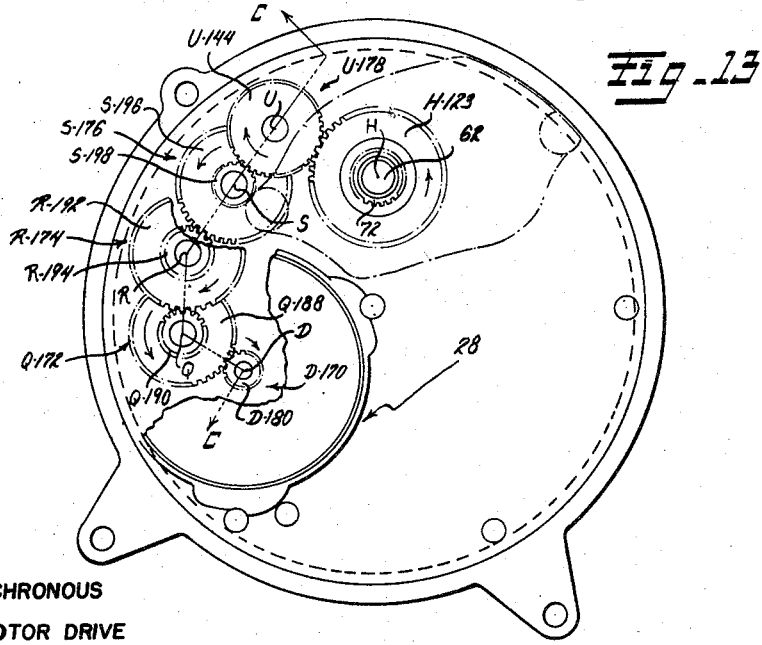
Figure 14:
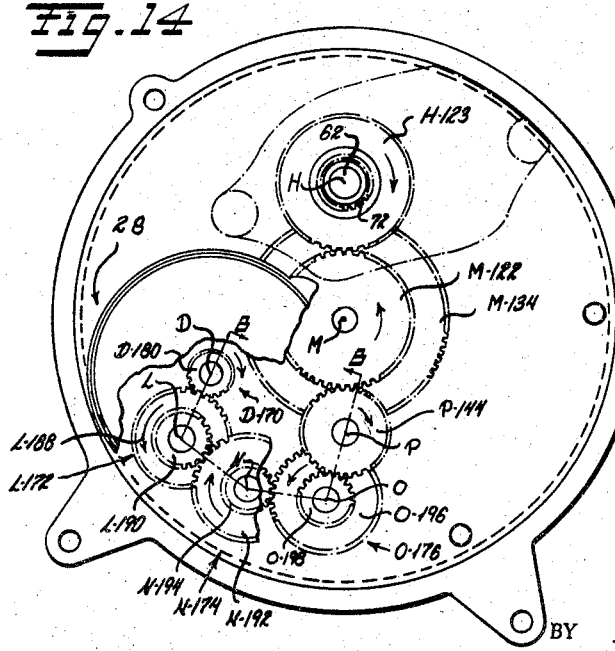

In Figure 13, the clockwise drive input results in counterclockwise output. The transmission may also be assembled to obtain counterclockwise rotation of shaft 62 output from a synchronous motor rotating in the same direction. To accomplish this end, the transmission is arranged as shown in Figure 14, utilizing drive train B—B, main arbor gear M-122 and M-134 and hub drive shaft gear H-123. Motor 28 imparts counterclockwise rotation to pinion D-180 which is transmitted through the gears of train B—B and gear M-122 resulting in counterclockwise rotation of gear H-123 and shaft 62.

From the structure and operation thus far described, it will be understood that with gear trains of a given ratio, viz., 18-1, a variety of output speeds may be obtained with the mainspring, D. C. motor and turbine drives by substitution of escapements and with the synchronous motor drive by substitution of motors and/or modification of current frequency. For each shaft speed so obtained, a variety of final chart speeds may be achieved by the use of a suitable converter turret 30 (Figure 6) installed in the manner described. The ratio of gears 92, 96 and 98 of the turret may be varied within the wide limits. By using a number of turrets of different ratios, various shafts speeds above, below and intermediate those obtained with the one hour and 7 hour escapements are instantly available by switching converter turrets.

The various gear combinations possible and chart hub speeds obtainable with the invention are tabulated below:

for gear elements R-174, S-176 and U-178 of train C—C and elements N-174, O-176 and P-178 of train B—B.

Thus, the invention, in its disclosed form, utilizes gear elements as shown in the following tabulation in which the letter "X" denotes any axis or position in which the element is used, i. e., any prefix letter:

| Gear Element | Max. No. Required | Gear | Pinion | Number of Teeth | | Possible Axes of Rotation |
|---|---|---|---|---|---|---|
| | | | | Gear | Pinion | |
| —170 | 2 | | X-180 | | 20 | D, E |
| —172 | 2 | X-188 | X-190 | 20 | 36 | F, L, Q |
| —174 | 2 | X-192 | X-194 | 20 | 40 | G, N, R |
| —176 | 2 | X-196 | X-198 | 16 | 40 | I, O, S |
| —178 | 2 | X-144 | | 36 | | J, K, P, U |
| W-138 | 1 | | W-138 | | 20 | W |
| H-123 | 1 | H-123 | | 48 | | H |
| M-122 | 1 | M-122 | | 48 | | M |
| M-134 | 1 | M-134 | | 75 | | M |

It will be observed from the foregoing table that only nine different gear elements are required to assemble

*Gear combinations*

| Type of Drive | Escapement Required | Direction of Rotation | | Train(s) | |
|---|---|---|---|---|---|
| | | Input (Drive) | Output (Shaft 62) | Control | Drive |
| Mainspring | Yes | Clockwise | Clockwise | A—A | None |
| | | | Counterclockwise | A'—A | None |
| | | Counterclockwise | Clockwise | A'—A | None |
| | | | Counterclockwise | A—A | None |
| Turbine or D. C. Motor | Yes | Clockwise | Clockwise | A'—A | B—B |
| | | | Counterclockwise | A—A | C—C |
| | | Counterclockwise | Clockwise | A—A | C—C |
| | | | Counterclockwise | A'—A | B—B |
| Synchronous A. C. Motor | No | Clockwise | Clockwise | None | B—B |
| | | | Counterclockwise | None | C—C |
| | | Counterclockwise | Clockwise | None | C—C |
| | | | Counterclockwise | None | B—B |

*Speeds available*

| Escapement | Converter Turret | Chart Hub Speed (Time for Chart Hub) (To Make One Revolution) | |
|---|---|---|---|
| One Hour | None | ±24 Hr. | |
| | Suitable Turret | +2, 3, 4, 6 −8, 12, 48 and 72 Hr. | |
| Seven Hour | None | ±7 days | These speeds not available in Synchronous A. C. Motor Drive. |
| | Suitable Turret | +14, 15, 30 − and 31 days. | |

A modification of the invention adapting it for use as a power clock with a rear drive shaft is shown in Figure 12 wherein like reference numbers are used to designate like parts. In this form main arbor shaft 114 (Figure 5) is replaced by a longer shaft 202 which extends through a bushing 204 in closure plate 100 on the back of housing 22. The projecting portion of the main arbor shaft 202 serves as a power take-off or output shaft in addition or to the exclusion of shaft 62, depending on the use to which the clock is put.

Throughout the foregoing description the various gear trains A'—A, A—A, B—B and C—C have been referred to as separate and distinct combinations of elements. It is pointed out, however, that this has been resorted to merely for the purpose of clarifying the disclosure and that, in fact, the trains are identical at least in the sense that they are comprised of identical gear elements and gear clusters.

Referring to Figure 4, it will be seen that the sole distinction between drive trains B—B and C—C resides in the loci of the axes of rotation of the various components. Thus trains B—B and C—C have gear elements D-170 in common having its axis at point D. Gear clusters Q-172 and L-172 are identical, the former having its axis at Q in train C—C and the latter having its axis at L in train B—B. The same is true, respectively the transmission variations disclosed and a total of fourteen gear elements is the maximum number ever used.

As a result, manufacture of the transmission is simplified and one transmission with its selective external components performs the function of a number of the widely different inflexible units heretofore employed. Furthermore, only one transmission housing, including support plates 102 and back closure plate 100, need be produced by the manufacturer or stocked by the distributor or consumer, such housings preferably having bushings or bearings installed to accommodate all possible combinations and gear trains or at least being provided with sockets into which the bushings may be pressed when and as needed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use in a clock assembly which may utilize any selected one of a group of torque generating means to coact with any selected one of a group of rotation governors, a subassembly comprising a housing, a rotary output shaft mounted in said housing and having one end projecting therefrom, means on the exterior of said housing for removably mounting a torque generating means, means within said housing adapted to mount a gear train for kinematically coupling said output shaft to the torque generating means, means on the exterior of said housing for removably mounting a rotation governor, and means within said housing adapted to mount a separate gear train for kinematically coupling said output shaft to a rotation governor independently of said first mentioned gear train.

2. In combination with the subassembly defined in claim 1, a torque generating means mounted on said torque generating means mounting means, and a gear train mounted in said housing by one of said gear train mounting means and kinematically coupled to said output shaft and said torque generating means.

3. In the combination defined in claim 2, a rotation governor mounted on said housing by said rotation governor mounting means and a second gear train mounted in said housing by the second said gear train mounting means and kinematically coupled to said output shaft and said rotation governor.

4. The combination defined in claim 3, wherein said gear trains are identical and interchangeable.

5. In a chart drive clock having a rotary chart drive shaft; a housing adapted to selectively mount torque generating, rotation regulating and shaft speed converting means and means within said housing for selectively mounting at least one of a plurality of identical gear trains in at least two positions for operatively connecting said drive shaft to a torque generating means and in at least two positions for connecting said drive shaft to a rotation regulating means.

6. In a chart clock, a housing, a chart drive shaft journalled in said housing, a rotatable power input gear element in said housing having a drive engaging portion extending through said housing, a driving gear train in said housing kinematically coupling said input gear element to said chart drive shaft, a control gear element in said housing having a drive engaging portion extending through said housing, a controlling gear train in said housing kinematically coupling said control gear element to said chart drive shaft, torque generating means having a rotary power shaft, means detachably mounting said torque generating means on said housing with the power shaft operatively associated with the drive-engaging portion of said input gear, an escapement having an escapement-controlled arbor, means mounting said escapement with said arbor operatively associated with the drive-engaging portion of said control gear element.

7. In a chart clock, a housing, a chart drive shaft journalled in said housing, a gear train in said housing coupled to said chart drive shaft, means for detachably mounting a torque generating unit on said housing, means for drivingly connecting said unit to said gear train to impart rotation to said drive shaft, a second gear train kinematically coupled to said first gear train, means for selectively detachably mounting an escapement on said housing in operative association with said second gear train.

8. A chart clock comprising a housing having means thereon for detachably mounting thereon torque generating and rotation control means; and a plurality of bearings located in said housing for mounting a plurality of gears in driving engagement; a chart drive shaft journalled on said housing, a torque generating and rotation control means mounted on said mounting means, and a plurality of intermeshed gears mounted on said bearings and defining a drive train from said torque generating and rotation control means to said chart drive shaft.

9. A chart clock comprising a housing, an output shaft rotatably mounted in said housing, means drivingly connected to impart rotation to said shaft, a uni-directionally operative rotation governor, gear means kinematically associating said governor and output shaft to achieve the operative direction of rotation of said governor, and alternative mounting means in said housing for selectively assembling said gear means to maintain said operative direction of rotation of the governor when the direction of rotation of said shaft is reversed.

10. Housing structure for use in a variety of types of chart clocks comprising a housing member, a first bearing on said housing for journalling a rotatable power shaft, a plurality of sets of spaced attachment members adapted to permit detachable mounting of a torque generating means and of a rotation control means on said housing, a first set of bearings on said housing member located to mount a gear train for operatively coupling said power shaft mounted on said first bearing to a torque generating means mounted on one of said sets of attachment members, and a second set of bearings on said housing located to mount a gear train for operatively coupling such a power shaft to a rotation control means mounted on a second set of said attachment members.

11. A transmission for a chart clock comprising a housing member, means for mounting a rotatable power shaft in said housing member, means for detachably mounting torque generating means and rotation control means on said housing, and first and second sets of bearing means in said housing member adapted to mount gear trains for operatively coupling a power output shaft, rotation control means, and torque generation means; said housing including a raised portion adjacent said power output shaft mounting means, said raised portions having means for mounting a speed ratio converter thereon.

12. A transmission housing for a chart clock comprising a housing member, a first bearing on said housing for journalling a rotatable power shaft, a plurality of sets of spaced attachment members adapted to permit detachable mounting on said housing of a torque generating means and of a rotation control means, first and second sets of bearing means on said housing located to mount a distinct gear train for operatively coupling the power output shaft mounted on said first bearing to a torque generating means mounted on one of said sets of attachment members, and a third set of bearings on said housing located to mount a gear train for operatively coupling such a power shaft to a rotation control means mounted in a second set of said attachment members.

References Cited in the file of this patent

UNITED STATES PATENTS

| | | |
|---|---|---|
| 1,077,611 | Korte | Nov. 4, 1913 |
| 1,107,410 | Corthell | Aug. 18, 1914 |
| 1,846,950 | Cosentino | Feb. 23, 1932 |
| 1,909,073 | Putnam | May 16, 1933 |
| 2,211,755 | McGay | Aug. 20, 1940 |
| 2,595,157 | Mayer | Apr. 29, 1952 |
| 2,655,797 | Hale | Oct. 20, 1953 |

UNITED STATES PATENT OFFICE
CERTIFICATE OF CORRECTION

Patent No. 2,852,907                                September 23, 1958

George E. Nicholson

It is hereby certified that error appears in the printed specification of the above numbered patent requiring correction and that the said Letters Patent should read as corrected below.

Column 7, line 24, for "A—A are identical" read -- A—A is identical --; line 53, for "are" read -- being --; column 12, in the table, first column thereof, under the heading "Gear Element", for the dash preceding "-170", "-172", "-174", "-176", "-178", each occurrence, read -- X --.

Signed and sealed this 16th day of December 1958.

(SEAL)
Attest:

KARL H. AXLINE
Attesting Officer

ROBERT C. WATSON
Commissioner of Patents